United States Patent [19]

Swaney

[11] Patent Number: 5,245,705
[45] Date of Patent: Sep. 14, 1993

[54] FUNCTIONAL ADDRESSING METHOD AND APPARATUS FOR A MULTIPLEXED DATA BUS

[75] Inventor: Richard E. Swaney, Fullerton, Calif.

[73] Assignee: Hughes Aircraft Company, Los Angeles, Calif.

[21] Appl. No.: 507,092

[22] Filed: Apr. 9, 1990

Related U.S. Application Data

[63] Continuation of Ser. No. 287,526, Dec. 19, 1988, abandoned, which is a continuation of Ser. No. 178,799, Mar. 25, 1988, abandoned, which is a continuation of Ser. No. 621,883, Jun. 18, 1984, abandoned, which is a continuation of Ser. No. 307,970, Oct. 2, 1981, abandoned.

[51] Int. Cl.$^5$ .................. G06F 15/16; G06F 13/38
[52] U.S. Cl. .................. 395/200; 395/725; 364/DIG. 1; 364/240; 364/284.3; 364/284; 364/241.8; 364/229; 364/229.3
[58] Field of Search .................. 395/200, 725, 800

[56] References Cited

U.S. PATENT DOCUMENTS

| | | | |
|---|---|---|---|
| 3,453,597 | 7/1969 | Pomerene | 340/825.52 |
| 3,638,192 | 1/1972 | Rutherford et al. | 340/825.68 |
| 3,801,962 | 4/1974 | Moore et al. | 364/200 |
| 3,962,706 | 6/1976 | Dennis et al. | 364/200 |
| 4,205,326 | 5/1980 | Porter et al. | 340/147 R |
| 4,218,756 | 8/1980 | Fraser | 364/900 |
| 4,342,083 | 7/1982 | Freedman et al. | 364/200 |
| 4,424,565 | 1/1984 | Larson | 364/200 |
| 4,481,625 | 11/1984 | Roberts et al. | 370/85 |
| 4,510,492 | 4/1985 | Mori et al. | 340/825.05 |
| 4,562,535 | 12/1985 | Vincent et al. | 364/200 |
| 4,591,971 | 5/1986 | Darlington et al. | 364/200 |

FOREIGN PATENT DOCUMENTS

| | | |
|---|---|---|
| 036766 | 9/1981 | European Pat. Off. . |
| 48-79552 | 10/1973 | Japan . |
| 51-81537 | 1/1976 | Japan . |

OTHER PUBLICATIONS

IEEE Transactions on Communications vol. COM-25, No. 1, pp. 104–116 Gray, J. R.
Node Processor for Distributed System Control, J. G. Sams, IBM Technical Disclosure Bulletin, vol. 23, No. 5, Oct. 1980.

Primary Examiner—Kevin A. Kriess
Attorney, Agent, or Firm—Wanda K. Denson-Low

[57] ABSTRACT

A method of functional addressing which may be employed with a multiplexed data bus having a plurality of data processing units coupled thereto. A function address is generated and made part of a transmitted message. Units receiving the transmitted message apply the function address to the address lines of a random access memory and read the contents of the memory at a location indicated by the function address. The contents stored at each memory location are indicative of whether or not that type of message is accepted or disregarded by the receiving unit. Also, a method of changing the contents of the memory, and hence the routing of messages between units, is disclosed.

14 Claims, 4 Drawing Sheets

FUNCTIONAL ADDRESSING METHOD AND APPARATUS FOR A MULTIPLEXED DATA BUS

This is a continuation of application Ser. No. 07/287,526 filed Dec. 19, 1988, now abandoned, which is a continuation of application Ser. No. 07/178,799, filed Mar. 25, 1988, now abandoned, which is a continuation of application Ser. No. 06/621,883 filed Jun. 18, 1984, abandoned, which is a continuation of application Ser. No. 397,970, filed Oct. 2, 1981, now abandoned.

BACKGROUND OF THE INVENTION

The present invention relates generally to multiplexed data buses, and more particularly, to a functional addressing method for use with a multiplexed data bus which employes a single signal to control the operation of systems attached thereto.

In present ground command, control, communications, and intelligence information systems, the traditional hierarchical architecture under control of a central computer results in an inflexible system configuration. A large percentage of the development, procurement, and maintenance costs of such systems are attributable to interface circuitry, cables, and connectors, and the like. Typical system specifications require a system architecture capable of continued operation during the failure and repair of individual units, and during operational reconfiguration of the system. This necessitates an interconnect structure containing no critical nodes or central control elements. These requirments may be met by utilizing an interconnect system employing a data bus which is shared by all units and which comprises a standard bus interface in each unit.

In a conventional large scale system, the interconnection of computers, processors, displays, and peripheral units requires a unique hierarchical arrangement where the function of a unit is determined by its position in the interconnecting topology. Moreover, the associated interfaces of any one type of unit would change, depending on its location in the topology. The conventional system contains a central computer connected to mini-computers through interface units, which in turn communicate with peripherals, displays and communication equipment by way of specialized controllers.

To ensure continuous operation when unit failures occur, the conventional system is redundant, in that a plurality of complete systems are provided to compensate for unit failure. As the number of units in the system increases, the number of point to point interconnections increases at a greater rate and so do the necessary interface units, cards, and cables. The configuration of the interconnecting elements in the topology may vary from system to system, and hence integration of these various systems is most complex.

To circumvent some of the problems associated with this conventional type of system, a single multiplexed data bus may be employed interconnecting each of the units in the system. The central computer may be eliminated by utilizing distributed processing. The computer units are required to interface only with the data bus. Any computer may perform any role in the system since each computer is connected directly to all other computers, peripherals and displays by way of the multiplexed data bus. Continued operation during the failure of a unit only requires an additional backup unit. The result is reduction in the types and numbers of units in the system, and the number of interface cards per unit.

As a result, acquisition and life cycle costs are reduced because inventory and maintenance requirements are alleviated.

The routing of messages between units coupled to the data bus is an important design consideration when attempting to arrive at a high-speed data bus. All known prior art data bus designs have employed physical addressing techniques to route messages from unit to unit. This physical addressing procedure requires all originating units on the bus to maintain a logical-to-physical relationship of the entire system. Any change in system role or resources required manual action to reallocate functions to equipment and to set up the new logical-to-physical relationship between all units. Typically, a set of manual switches was used to control the identification of a particular unit, and manual manipulation of the switches was required to modify the logical-to-physical relationship between units.

Thus it would be an advance in the data transmission art to provide a method of functional addressing which eliminates the need for the logical-to-physical relationship between units coupled to a data bus.

It would also be an advance in the data transmission art to provide a method of functional addressing which eliminates the manual switch-setting function to identify units.

It would be a further advance in the data transmission art to provide a method of functional addressing which supports the use of distributed processing concepts applied to a multiplexed data bus that allows for modification of the system configuration at any time.

SUMMARY OF THE INVENTION

In order to overcome the above-mentioned problems associated with conventional systems, the present invention provides for a method of routing messages between a plurality of data processing units coupled to a data bus which comprises the following steps. A unit which intends to transmit a message generates a function code or address which is a portion of the message. The unit then transmits the message containing the function code or address over the data bus. The message is then received by a bus interface portion of all the other units. Each of the bus interfaces then compares the received function code to address a set of predetermined codes associated with its unit. If the received function code or address matches any of the predetermined codes, then the bus interface accepts the message and passes the message to its unit. However, if the received function code or address does not match any of the predetermined codes, then the bus interface disregards the receive message, thereby preventing its unit from receiving the message. In this way, only the unit or units requiring the data receives it from the bus.

The functional addressing method allows for routing of information over the data bus in a manner which provides for system flexiblity, without manual allocation of functions to the equipment coupled to the data bus. In addition, the functional addressing technique of the present invention does not require a manual set-up to maintain a logical-to-physical relationship between the various units coupled to the data bus.

In particular, the functional addressing technique employs a 12-bit function code or address in the first word of each message which addresses a 4096 by 1 bit random access memory (RAM) to determine if the message should be accepted. The design permits each addressee to recognize any combination of up to 4096 addresses.

Functional addressing allows software modules to communicate with other software modules without knowing the physical location where the module resides. Peripheral equipment, such as a digital communication interface unit, may route received messages to the appropriate software module without knowing which computer processes the data. By appropriate control of the function codes associated with each data processing unit, messages may be received by any set of such units having the need for such information. Functional addressing supports automatic reallocation of functions by allowing the function allocating computer to re-direct messages to other units for processing by changing the contents of the function code RAM in each bus interface.

The present invention also provides for a method which allows the memory to be changed or updated by means of the function code or address. The contents of the memory may be changed by transmitting a control word containing a function code or address indicative of a write operation of the memory. The write operation updates the contents of the memory with new routing information. Thus, different functional addresses control which units receive messages as indicated in the updated contents of the memory.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
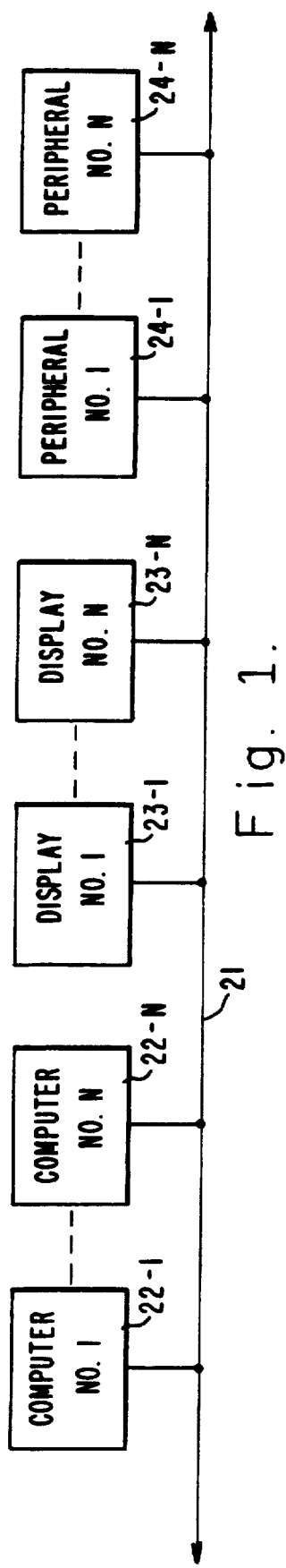
FIG. 1 illustrates a serial multiplexed data bus system which may employ the principles of the present invention.

Referring to FIG. 1 there is shown a multiplexed data bus in which the present invention may be employed. The system includes a serial data bus 21 to which is coupled a plurality of units, such as computers, displays, and peripherals. For example, a plurality of computers 22-1, ... 22-N, a plurality of displays 23-1, ... 23-N, and a plurality of peripherals 24-1 ... 24-N may be connected to the data bus 21. The data bus 21 may be a typical coaxial or triaxial cable with a center conductor surrounded by one or two grounded shields and appropriate transformer couplings provided in order to connect the computers, displays, and peripherals thereto. The computers 22 connected to the data bus 21 may be of the same or dissimilar type. The displays 23 may be text, graphics, or large screen, or the like. The peripherals 24 include such items as terminals (CRT/keyboards), modems, printers, discs, and magnetic tapes, or the like.

Each of the units connected to the data bus 21 transmits information along the bus 21 to one or more of the other units. For example, the first computer 22-1 may transmit information to any of the other computers coupled to the bus 21, or transmit information to a peripheral 24, or any one or more of the displays 23. The transmitting unit places a data message on the bus 21 with a function code or address which addresses the function or process to be performed on the data in the message. The unit performing this function or process automatically receives the data because its bus interface is set to extract that kind of message. This will be discussed in more detail hereinbelow.

Figure 2:
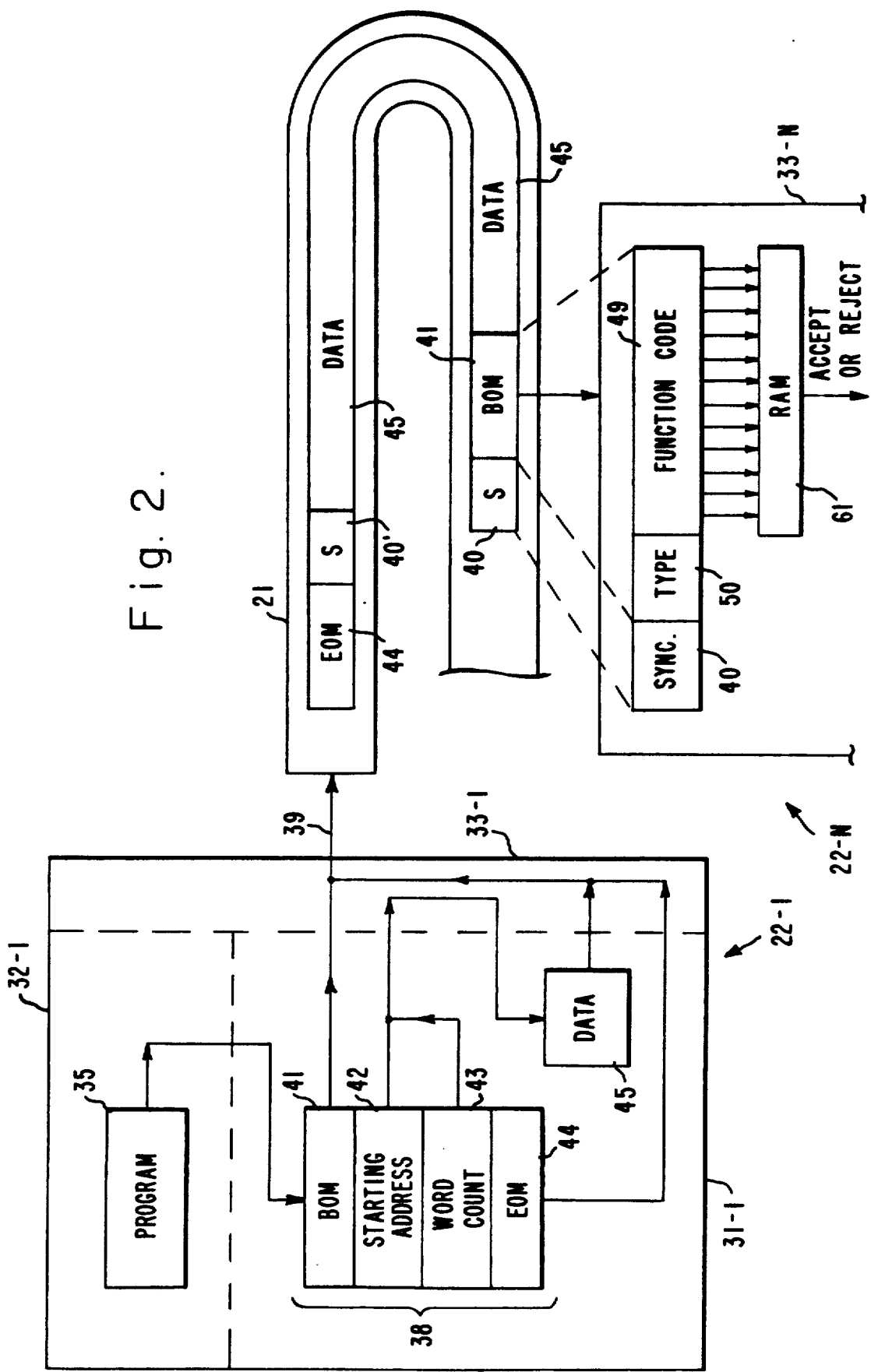
FIG. 2 illustrates the concept of functional addressing.

Referring to FIG. 2, there is shown a diagram which illustrates functional addressing. A computer, for example, such as the first computer 22-1, is comprised of a memory 31-1, processor 32-1 and bus interface 33-1. A processor 32-1 executes a program 35, and an input/output instruction gives the bus interface 33-1 the location of where an output control block 38 is stored in memory 31-1. When the bus interface 33-1 transmits a message on the data bus 21, the message starts with a sync pulse 40, followed by a beginning of message word 41, data words 45, another sync pulse 40', and an end of message word 44. An output control section of the bus interface 33-1 retrieves the beginning of message word 41 from the output control block 38 to form the first portion of the message. Next, the bus interface 33-1 retrieves from the output control block 38 the starting address 42 which indicates where the data words 45 are stored in the memory 33-1 and how many data words (word count 43) should be 20 transmitted. Following the beginning of message word 41, the bus interface 33-1 retrieves the data words 45 from the memory 33-1. Finally, the bus interface 33-1 retrieves the end of message word 44 from the output control block 38 to form the last portion of the message.

Figure 3:
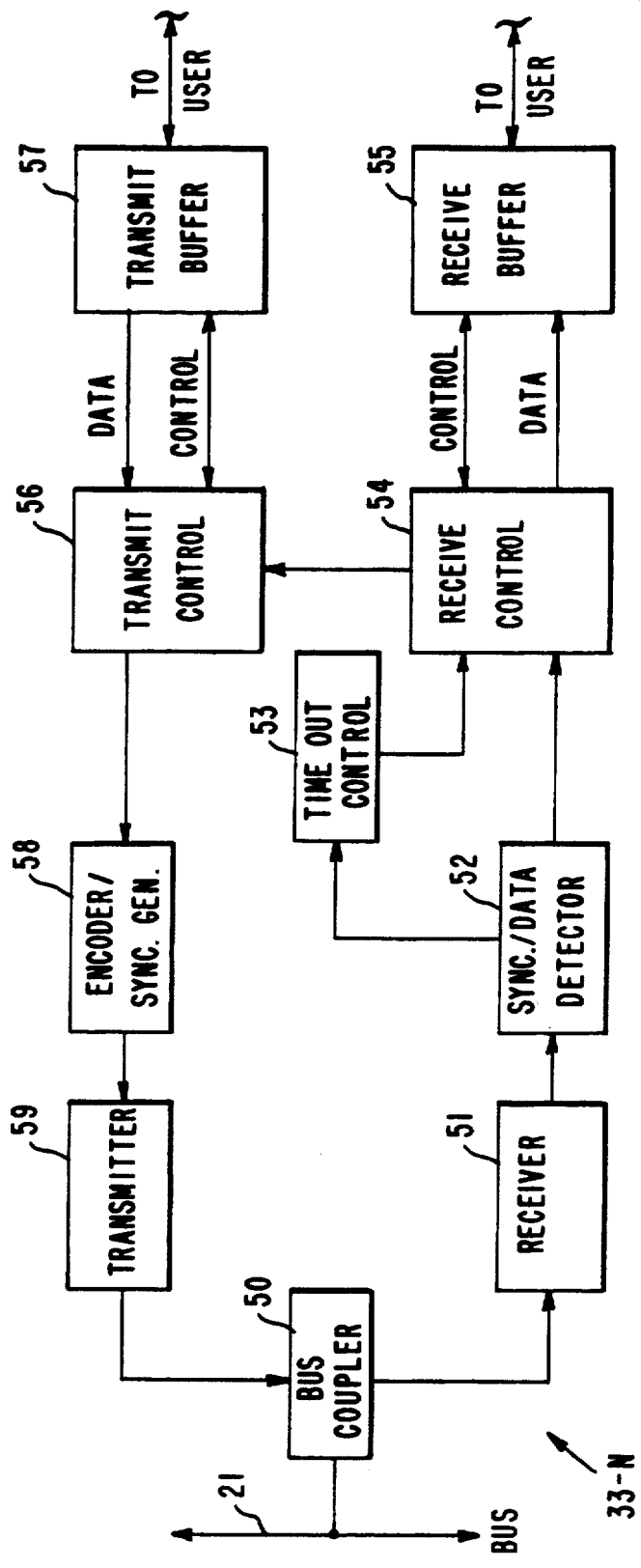
FIG. 3 illustrates a typical bus interface.

The composite message 39 is received by all bus interfaces which individually determine if the attached unit is to accept the transmitted data contained therein. FIG. 3 shows a block diagram of a typical bus interface 33-N. The bus interface 33-N is coupled to the transmission line of the data bus 21 through a bus coupler 50, which is generally comprised of an isolation transformer which presents a high impedance, short stub to the transmission line. The bus interface 33-N is split into two basic portions, receiver portion and transmitter portion. The bus coupler 50 is connected to a receiver 51 which allows the receiver 51 to sense signals as they propagate past the coupler 50 on the data bus 21. The sensed signal is amplified and conditioned by the receiver 51 and applied to the sync/data detector 52. The presence of a sync pulse in an incoming signal is detected by sync/data detector 52 which converts the bits of information following the sync pulse from an encoded waveform to a decoded serial bit stream. A serial-to-parallel converter in the sync/data detector 52 converts the serial bit stream into parallel words which are presented to receive control circuitry 54 for interpretation.

The receive control circuitry 54 distinguishes control words from data words and decodes control words. If the control word is a beginning of message word, the receive control circuitry 54 determines whether to accept or reject the message. The sync detector 52 is also coupled to timeout control circuitry 53 and provides a signal indicative of when units are transmitting over the bus. The timeout control circuitry 53 monitors the data bus 21 for time periods when the bus is inactive, and provides appropriate signals to the receive control circuitry 54.

The transmitter portion of the bus interface comprises transmit control circuitry 56 and transmit buffer circuitry 57 which controls the data flow from the user. An encoder/sync generator 58 converts parallel words from the user into a serial bit stream, encodes the waveform of the bit stream, and interjects sync pulses into the signals to be transmitted. The output of the encoder/sync generator 58 is connected through a transmitter 59 to the bus. The transmitter 59 transmits the signal over the data bus 21 by way of the bus coupler 50.

The method of the present invention is implemented in the receive control circuitry 54. The receive control circuitry 54 maintains one or more receive addresses or function codes and compares the data message function address of all received data messages against its receive address(es) or function code to determine whether to accept or reject the message. When a message is accepted, the receive control circuitry 54 controls the flow of the data words to the user (computer, terminal, etc.) through receive buffer circuitry 55.

Referring again to FIG. 2, in order to determine whether the data 45 is to be accepted by the unit 22-N, the beginning portion of the composite message 39 is comprised of the sync pulse 40, followed by a beginning of message word 41 which includes a function code or address 49 and word type code 50. The function code is a 12-bit word having a predetermined pattern of ones and zeros which identify a particular function or process to receive the data. The function code or address 49 addresses a 4 k by 1 bit random access memory (RAM) 61 in the bus interface 33 of every unit 22, 23, 24 coupled to the data bus 21 to determine if that unit contains the receiving function code by reading a bit from the RAM 61. If the bit addressed by the function code or address 49 in RAM 61 is read out as a 'one', the transmitted message 39 is accepted and passed to the attached unit. However if the bit addressed by the function code or address 49 in RAM 61 is read out as a 'zero', then the bus interface 33-N rejects the transmitted composite message 39.

Figure 4:
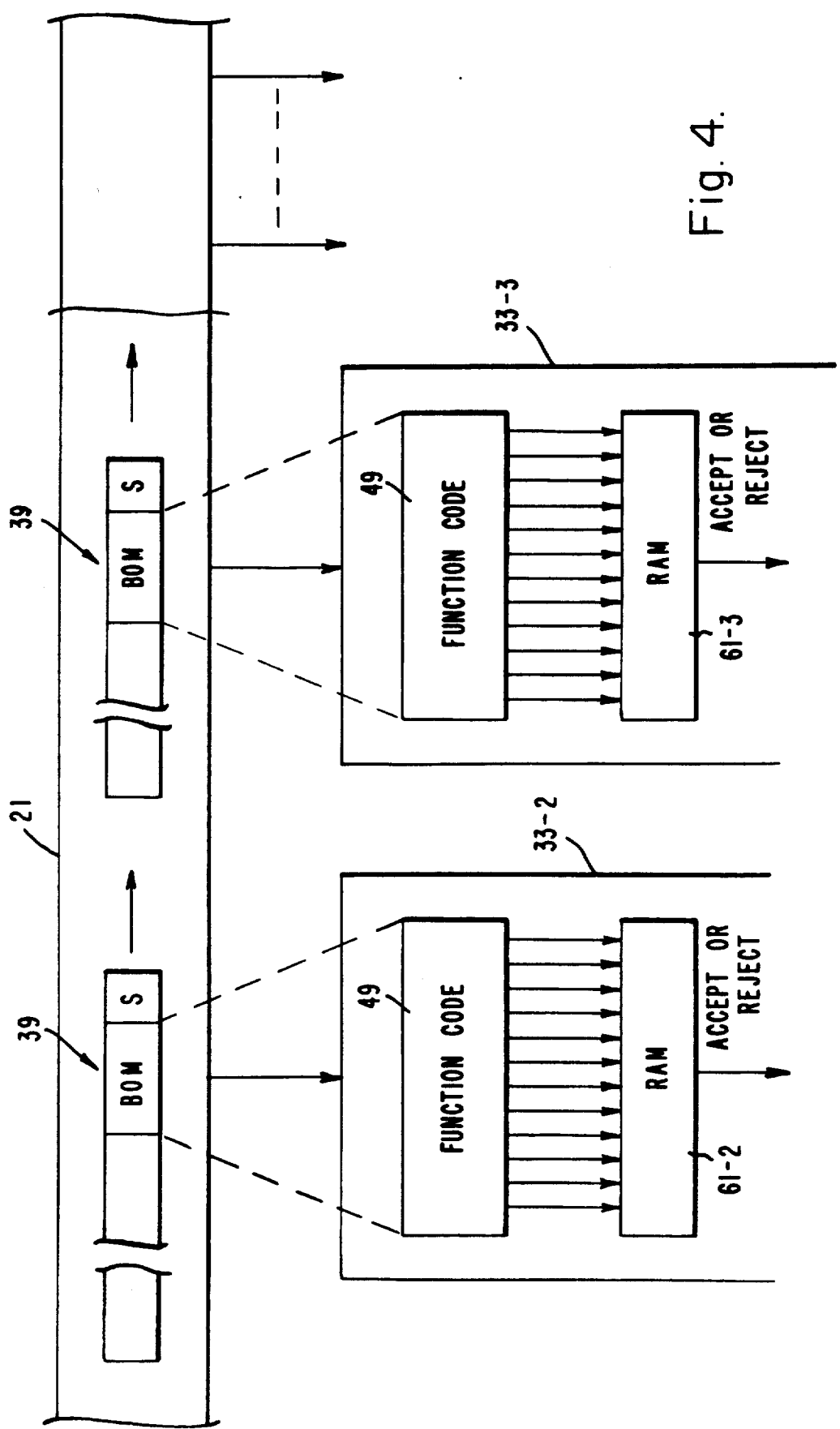
FIG. 4 illustrates the operation of the functional addressing method of the present invention.

Referring to FIG. 4 there is shown the data bus 21 having the composite message 39 transmitted therealong. The beginning of message signal 41, which is a portion of the composite message 39 is accepted by the bus interfaces 33-2, 33-3 of two of the units 22-2, 22-3 coupled to the data bus 21. The function code 49 is received by each of the bus interfaces 33-2, 33-3 of these units 22-2, 22-3, and applied to separate random access memories 61-2, 61-3. A comparison of the function code 49 in the random access memories 61-2, 61-3 generates output signals which indicate either to accept or reject the transmitted message 39.

When a message 39 is transmitted along the data bus 21, all bus interfaces sense and receive the message and use the function code or address 49 in the beginning of message signal 41 as a memory address for a memory read operation in the random access memory 61. The programming of the functional codes of a particular RAM 61-2 in a particular bus interface 33-2 determines if that particular bus interface 33-2 accepts or rejects that message 39. For example, the RAMs may be programmed so that all bus interfaces reading a 'zero' reject the message 39 while all bus interfaces reading a 'one' accept and pass the message to its attached unit. Using a 12-bit function code as shown in FIGS. 2 and 4, allows each bus interface unit to recognize up to 4096 functional addresses.

The particular functional addresses which may be recognized by a particular bus interface unit may be changed by transmitting a control message over the data bus 21 or sending a message directly from a user bus interface to a particular function code RAM. Each word of this control message may contain a function code or address and a single bit of information which indicates where to accept or reject messages, with that function code or address. The function code or address in each control word may be used as a memory address for a memory write operation. The particular information bit is then written into the function code RAM. This operation updates the contents of the memory with new routing information. Thus, different functional addresses control which units receive messages as determined by the updated contents of the memory.

The functional addressing technique eliminates the need for the system to maintain a logical-to-physical relationship between the various components coupled to the data bus 21. Functional addressing allows software modules to communicate with other software modules without knowing the physical data processing unit in which a receiving software module resides. Peripheral equipment, such as digital communications interface units, may route received messages to appropriate software modules without knowing which data processing unit does the processing. The functional addressing technique allows for automatic reallocation of computing functions by allowing a function allocating computer to set another data processing unit's bus interface unit to accept all messages assigned to that unit for processing.

Figure 5:
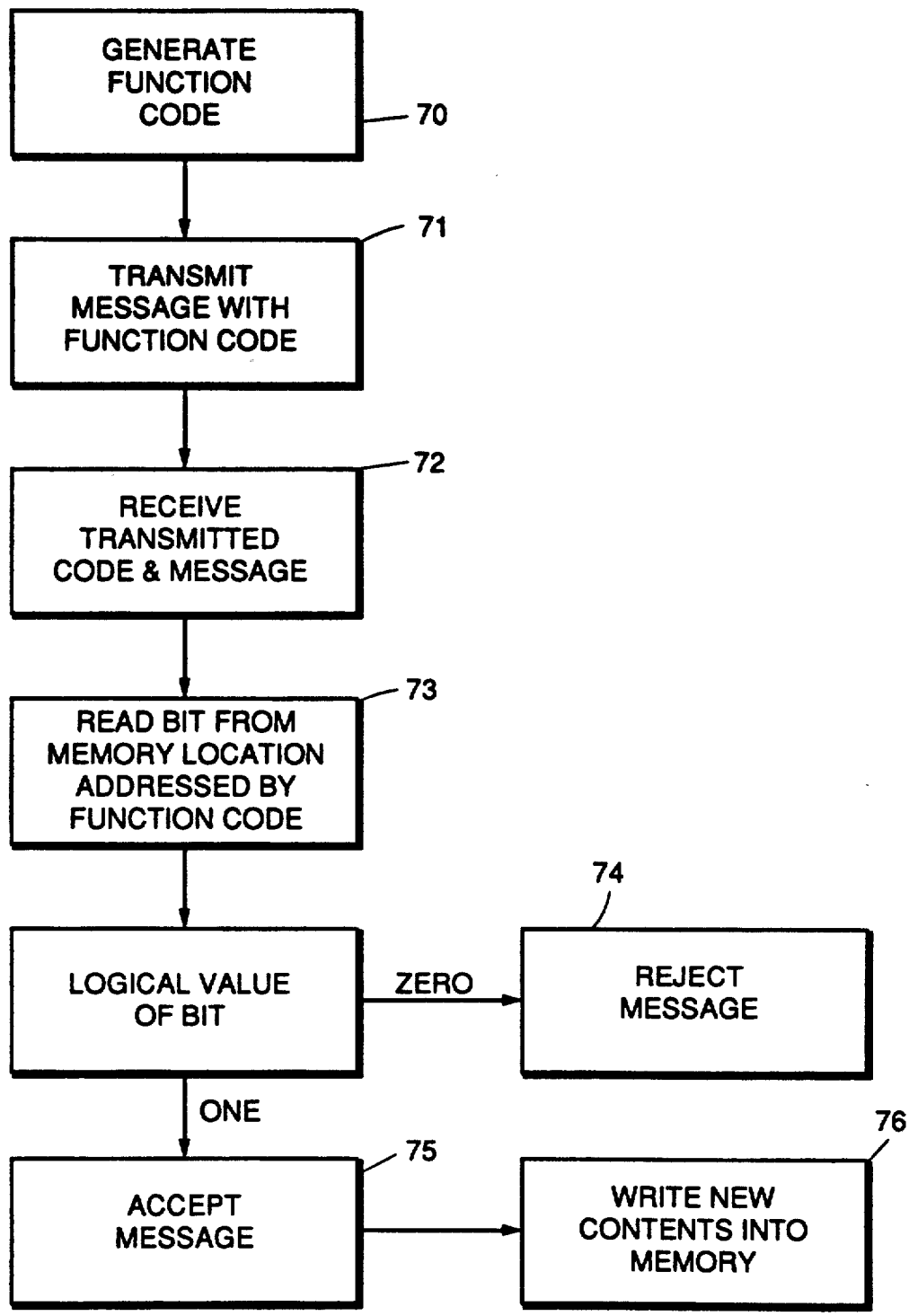
FIG. 5 is a flow diagram illustrating the functional addressing method of the present invention.

Thus, for the purposes of clarity, and with particular reference to FIG. 5 the method of the present invention comprises the following steps. The first step is to generate a function code or address, identified by box 70. This function code or address is then transmitted as a portion of a message along the data bus to all data processing units coupled to the data bus 21, as indicated in box 71. The transmitted function code or address and message is then received by all units coupled to the data bus 21, as indicated in box 72. The function code or address is then used as the memory address for a read operation to a random access memory in the bus interface of each unit, as indicated in box 73. If the value read out is a logical 'zero', then the message is rejected by a particular unit, indicated in box 74. However, if the value read out is a logical 'one', then the message is accepted by that particular unit for processing, as indicated in box 75. The contents of the memory may be updated by transmitting a function code or address indicating a write operation associated with the memory, as indicated in box 76.

Thus, there has been described a functional addressing technique for use with a multiplexed data bus which eliminates the requirement of logical-to-physical relationships between the units coupled to the bus. The functional addressing technique of the present invention also eliminates the need for manual action to reallocate the functions to equipment coupled to the bus or to set up a new logical-to-physical relationship in the newly added units.

It is to be understood that the above-described embodiment is merely illustrative of one of the many specific embodiments of which represent applications of the principles of the present invention. Clearly, numerous and varied other arrangements may be readily devised by those skilled in the art without departing from the spirit and scope of the invention.

What is claimed is:

1. A data processing system for use with a multiplexed data bus comprising:

a plurality of bus interface units individually coupled to said data bus at spaced locations for generating data messages to be transferred to said data bus and for receiving data messages propagating along said data bus, each said bus interface unit being coupled to an associated data processing unit for transmitting data thereto and receiving data therefrom, each said data message containing data to be transmitted over said data bus, each said data message further containing a function code which identifies a data processing function to be performed on the transmitted data;

each said bus interface unit further including:

means for sensing said data messages as they propagate by that said interface unit on said data bus, said sensing means sensing said message;

means for providing a selectable function code which identifies a data processing function to be performed on data received by that said bus interface unit, wherein said means for providing a selectable function code includes random access memory, a single bit of said random access memory having the address of said function code being the selectable function code, the single bit being in the set state when said selectable function code has been selected;

means for comparing the function code in the sensed data message with the selected function code of that said bus interface unit, said means for comparing including means for reading the contents of the one bit having an address identified by said sensed function code, a set condition of said one bit indicating that said selectable function code is identical to the sensed function code in said message; and means for transmitting the data in said message to the associated data processing unit only when the sensed function code in the data message is identical to the selected function code in that said interface unit.

2. A data processing system according to claim 1 wherein each said interface unit includes means for changing the selectable function code in said random access memory in response to said data message.

3. A data processing system according to claim 1 wherein said random access memory is an N×1 random access memory.

4. A data processing system according to claim 2 wherein said random access memory is an N×1 random access memory.

5. A method of routing messages among a plurality of bus interface units coupled to a multiplexed data bus, each said bus interface unit being coupled to an associated data processing unit for transmitting data thereto and receiving data therefrom, each said bus interface unit having a selectable function code which identifies a data processing function to be performed on data received by that said bus interface unit, said selectable function code being selectively stored in an random access memory in said bus interface unit, said selectable function code being the address of one bit of said random access memory, said one bit of said random access memory being in the set condition when said selectable function code has been selected, said method including the steps of:

generating a message at one of said bus interface units in response to the associated data processing unit that is coupled thereto, said message containing data to be transmitted over said data bus and a message word having a function code which identifies a data processing function to be performed on the transmitted data;

transmitting said message over said data bus; and at each one of the other said bus interface units;

sensing the function code in said message as said message propagates along said data bus;

comparing the sensed function code in the message with the selectable function code at that said bus interface unit, the step of comparing comprising reading the contents of the one bit having an address identified by the sensed function code in said message, a set condition of said one bit indicating that said selectable function code is identical to the sensed function code in said message; and transmitting the data to the associated data processing unit only when the sensed function code and the selectable function code are identical.

6. A method of routing messages among a plurality of bus interface units coupled to a multiplexed data bus as recited in claim 5 wherein said multiplexed data bus is a serial data bus and said message is a serial word.

7. A method of routing messages among a plurality of bus interface units coupled to a multiplexed data bus as recited in claim 6 further comprising after the step of sensing the function code in said message and before the step of comparing, the step of converting the sensed function code in said message to a parallel word.

8. A method of routing messages among a plurality of bus interface units coupled to a multiplexed data bus as recited in claim 5 wherein said multiplexed data bus is a parallel data bus and said message word is a parallel word.

9. A method of routing messages among a plurality of bus interface units coupled to a multiplexed data bus as recited in claim 5 wherein said random access memory is an N×1 random access memory.

10. A method of routing messages among a plurality of bus interface units coupled to a multiplexed data bus as recited in claim 6 wherein said random access memory is an N×1 random access memory.

11. A method of routing messages among a plurality of bus interface units coupled to a multiplexed data bus as recited in claim 7 wherein said random access memory is an N×1 random access memory.

12. A method of routing messages among a plurality of bus interface units coupled to a multiplexed data bus as recited in claim 8 wherein said random access memory is an N×1 random access memory.

13. A method of routing messages among a plurality of bus interface units coupled to a multiplexed data bus as recited in claim 5 wherein said step of generating a message further includes generating a message containing data to be transmitted over said data bus and a message word having a function code which writes a new selectable function code to said random access memory to replace the current selectable function code.

14. A method of routing messages among a plurality of bus interface units coupled to a multiplexed data bus as recited in claim 6 wherein said step of generating a message further includes generating a message containing data to be transmitted over said data bus and a message word having a function code which writes a new selectable function code to said random access memory to replace the current selectable function code.

* * * * *